United States Patent
De Smet (10) Patent No.: US 10,509,654 B2
(45) Date of Patent: Dec. 17, 2019

(54) MULTI-THREADED CONSTRAINT SATISFACTION SOLVER

(71) Applicant: Red Hat, Inc., Raleigh, NC (US)

(72) Inventor: Geoffrey De Smet, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 138 days.

(21) Appl. No.: 15/672,364

(22) Filed: Aug. 9, 2017

(65) Prior Publication Data

US 2019/0050225 A1 Feb. 14, 2019

(51) Int. Cl.
G06F 17/50 (2006.01)
G06F 9/30 (2018.01)
G06F 9/50 (2006.01)
G06F 9/52 (2006.01)
G06F 15/80 (2006.01)

(52) U.S. Cl.
CPC .......... G06F 9/3009 (2013.01); G06F 9/5083 (2013.01); G06F 9/52 (2013.01); G06F 15/80 (2013.01)

(58) Field of Classification Search
CPC .... G06F 9/3009; G06F 9/5061; G06F 9/5077; G06F 11/3447; G06F 17/00; G06F 17/505
USPC ................................................. 716/103, 132
See application file for complete search history.

(56) References Cited

U.S. PATENT DOCUMENTS

| | | | |
|---|---|---|---|
| 8,515,882 B2 | 8/2013 | Bell, Jr. et al. | |
| 9,256,824 B2 | 2/2016 | Cantin et al. | |
| 9,305,257 B2 | 4/2016 | Cantin | |
| 2013/0024395 A1 | 1/2013 | Clark et al. | |
| 2013/0218789 A1 | 8/2013 | Guo | |
| 2014/0344021 A1 | 11/2014 | Thalken | |
| 2018/0088944 A1* | 3/2018 | Subramanian | G06F 9/3009 |

FOREIGN PATENT DOCUMENTS

WO  2016187043 A1  11/2016

OTHER PUBLICATIONS

Author Unknown, "OptaPlanner User Guide," Version 6.0.0.Beta1, docs.jboss.org/drools/release/6.0.0.Beta1/optaplanner-docs/html_single/, accessed May 4, 2017, 87 pages.

(Continued)

*Primary Examiner* — Paul Dinh
(74) *Attorney, Agent, or Firm* — Withrow & Terranova, PLLC (57) ABSTRACT

An object-oriented method for multi-threading in a constraint satisfaction solver is provided. A master thread establishes a first solution state of a constraint problem. The master thread establishes a plurality of solver threads, each solver thread having an initial solution state that is identical to a first solution state of the master thread, and a plurality of cloned planning entity objects that are clones of a plurality of planning entity objects. The master thread communicates a first plurality of temporary incremental state changes to the plurality of solver threads that alters the initial solution state of each solver thread to a different solution state. The master thread receives, from each respective solver thread of the plurality of solver threads, a first score associated with the different solution state of the respective solver thread.

20 Claims, 8 Drawing Sheets

(56) References Cited

OTHER PUBLICATIONS

Chong, Wan Wee, "Meta-heuristics Development Framework: Design and Applications," Master Thesis Presentation, National University of Singapore, Jul. 28, 2004, 60 pages.

El-Sherbeny, Nasser, "Vehicle routing with time windows: An overview of exact, heuristic and metaheuristic methods," Journal of King Saud University, vol. 22, 2010, pp. 123-131.

* cited by examiner

MULTI-THREADED CONSTRAINT SATISFACTION SOLVER

TECHNICAL FIELD

The examples relate to a multi-threaded constraint satisfaction solver that utilizes heuristics and/or metaheuristics to solve optimization problems.

BACKGROUND

A constraint satisfaction solver uses heuristics and metaheuristics to identify a sufficiently good solution to an optimization problem.

SUMMARY

The examples implement an object-oriented multi-threaded constraint satisfaction solver that utilizes a master thread and a plurality of solver threads. The solver threads have cloned planning entity objects that correspond to planning entity objects of the master thread, which allows each solver thread to have an independent model of the constraint problem that is identical to the master thread, and to which incremental changes can be applied without impacting the other solver threads.

In one example, an object-oriented method for multi-threading in a constraint satisfaction solver is provided. A master thread establishes a first solution state of a constraint problem. The first solution state is based at least in part on a collective state of a plurality of planning entity objects used to model the constraint problem. The master thread establishes a plurality of solver threads, each solver thread having an initial solution state that is identical to the first solution state, and a plurality of cloned planning entity objects that are clones of the plurality of planning entity objects. The master thread communicates a first plurality of temporary state changes to the plurality of solver threads that alters the initial solution state of each solver thread to a different solution state. The master thread receives, from each respective solver thread of the plurality of solver threads, a first score associated with the different solution states of the respective solver threads.

In another example, a computing device is provided. The computing device includes a memory and at least one processor device coupled to the memory. The at least one processor device is to establish, via a master thread, a first solution state of a constraint problem, the first solution state based at least in part on a collective state of a plurality of planning entity objects used to model the constraint problem. The at least one processor device is further to establish, by the master thread, a plurality of solver threads, each solver thread having an initial solution state that is identical to the first solution state, and a plurality of cloned planning entity objects that are clones of the plurality of planning entity objects. The at least one processor device is further to communicate, by the master thread, a first plurality of temporary state changes to the plurality of solver threads that alters the initial solution state of each solver thread to a different solution state, and receive, from each respective solver thread of the plurality of solver threads, a first score associated with the different solution states of the respective solver threads.

In another example, a computer program product stored on a non-transitory computer-readable storage medium is provided. The computer program product includes instructions to cause a processor device to establish, via a master thread, a first solution state of a constraint problem, the first solution state based at least in part on a collective state of a plurality of planning entity objects used to model the constraint problem. The instructions further cause the processor device to establish, by the master thread, a plurality of solver threads, each solver thread having an initial solution state that is identical to the first solution state, and a plurality of cloned planning entity objects that are clones of the plurality of planning entity objects. The instructions further cause the processor device to communicate, by the master thread, a first plurality of temporary state changes to the plurality of solver threads that alters the initial solution state of each solver thread to a different solution state, each solver thread receiving a different temporary state change. The instructions further cause the processor device to receive, from each respective solver thread of the plurality of solver threads, a first score associated with the different solution states of the respective solver threads.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

A constraint satisfaction solver (CSS) utilizes optimization algorithms, such as, by way of non-limiting example, heuristics and metaheuristics, on a model of a constraint-based problem to identify a "best" solution to the problem. Some CSSs operate by iteratively generating and scoring a series of different incremental solutions, and evolving one or more initial solution states to intermediate solution states to ultimately converge on a final "best" solution state over time. The best solution state may be qualified in terms of processing time or other limitations. Based on the number of potential objects and variables in the particular model, millions of different solutions may be generated and scored, and thus constraint satisfaction solving can be extremely processor-intensive and time-consuming.

A CSS may, from one solution state, attempt tens, hundreds, thousands, or millions of individual incremental changes to that solution state to identify a "best" next solution state based on the scores resulting from the various incremental changes. Ideally, multiple incremental changes to a base solution state could be made and scored concurrently, in parallel, such as via multiple threads running concurrently on a multi-core processor, but if only a single model of the solution state exists in memory, the concurrently executing threads cannot independently alter the model without interfering with one another. One solution to this problem is to generate, for each incremental change and for each thread, a new copy of the objects in the model prior to the thread implementing an incremental change to the solution state. However, for models of any realistic complexity, the repeated copying of objects requires substantial memory resources and would be processor-intensive, increasing the resources required to determine a solution and increasing the time it takes to determine the solution. Moreover, this process eliminates the ability to score new solutions using incremental (sometimes referred to as delta) scoring, because each solution state would need to be completely re-scored, substantially increasing the time it takes to come to a final solution.

Central processing units (CPUs) increasingly have multiple cores, each of which can independently process a thread in parallel with the other cores. Programs written to take advantage of multi-core CPUs can accomplish more processing in less time than a single-core CPU. Similarly, a cloud computing environment offers scalable computing resources upon demand, and programs written to execute in multiple parallel threads can take advantage of such scalable computing resources in much the same way as in a multi-core processor.

The examples disclosed herein implement an object-oriented multi-threaded constraint satisfaction solver that eliminates the problems discussed above, and which is capable of efficiently generating different solution states, and scoring the different solution states in parallel using incremental scoring. The examples disclosed herein can reduce the time it takes to identify a "best" solution state by a large factor, and utilize fewer memory resources.

In particular, the examples utilize a master thread and a plurality of solver threads. The master thread has a model of the constraint-based problem. The model includes a plurality of planning entity objects. Each solver thread has a cloned model that includes clones of the planning entity objects of the master thread. The master thread generates a plurality of different temporary incremental state changes that differ from the current solution state of the master model, and sends the different state changes to the solver threads so each state change can be applied to the cloned model of a solver thread, and scored. The temporary state changes include references to one or more planning entity objects in the model of the master thread. The solver thread determines the corresponding cloned planning entity objects in the cloned model of the solver thread that correspond to the planning entity objects of the master thread, and implements the temporary incremental change on the one or more cloned planning entity objects. The solver thread then scores the incrementally changed cloned model using incremental scoring, and sends the score to the master thread. The solver thread may immediately undo the temporary incremental change, extract another temporary incremental change from a queue, and repeat the process.

The master thread, based on the scores received from the solver threads, determines a best new solution state associated with one of the temporary incremental state changes. The master thread alters the master model to the best new solution state by permanently applying the incremental state change to the master model. The master thread then sends, to each solver thread, a permanent incremental state change, sometimes referred to as a move relocation, that, when implemented by the solver threads, will place the cloned models of the solver thread in the same state as the newly changed master model. The master thread can then determine another round of incremental temporary state changes to send to the solver threads to implement and score. This process can be repeated until a "best" and final solution is converged upon by the master thread.

The examples, among other advantages, eliminate a need to repeatedly copy the planning entity objects of a model for each solver thread, while facilitating the parallel processing and incremental scoring of incremental changes to greatly reduce the overall elapsed time it takes to converge upon a solution. The embodiments have applicability to a wide variety of CSS optimization algorithms, including, by way of non-limiting examples, construction heuristics, local search (such as Tabu search and simulated annealing), and population metaheuristics (such as genetic algorithms and particle swarm optimization).

FIGS. 1A-1D are block diagrams of a constraint satisfaction solver 10 according to one example. For purposes of illustration, the examples will be discussed in the context of a classic, yet relatively simple, constraint-based problem regarding a 4×4 chess board and 4 queens. The solution to the 4-queens constraint-based problem is a state wherein no queen can attack another queen. Thus, one constraint is that two queens cannot be in the same column. Another constraint is that two queens cannot be in the same row. Other constraints are that two queens cannot be on the same diagonal.

The constraint satisfaction solver 10 includes a master thread 12. The master thread 12 includes an object-oriented model 14 of the 4-queens problem. The model 14 includes a plurality of planning entity objects 16-1M-16-4M, each of which represents one of the queens. A solution state image 18-M is provided in FIG. 1A for purposes of illustration to visually depict the solution state of the parent model 14 at a given point in time. At this particular point in time, the solution state of the model 14 is such that each queen is in a separate column of the chessboard and in row 1 of the chess board. Throughout the Figures, the planning entity object 16-1M corresponds to the queen Q1, the planning entity object 16-2M corresponds to the queen Q2, the planning entity object 16-3M corresponds to the queen Q3, and the planning entity object 16-4M corresponds to the queen Q4 of the model 14 of the master thread 12.

Figure 1A:
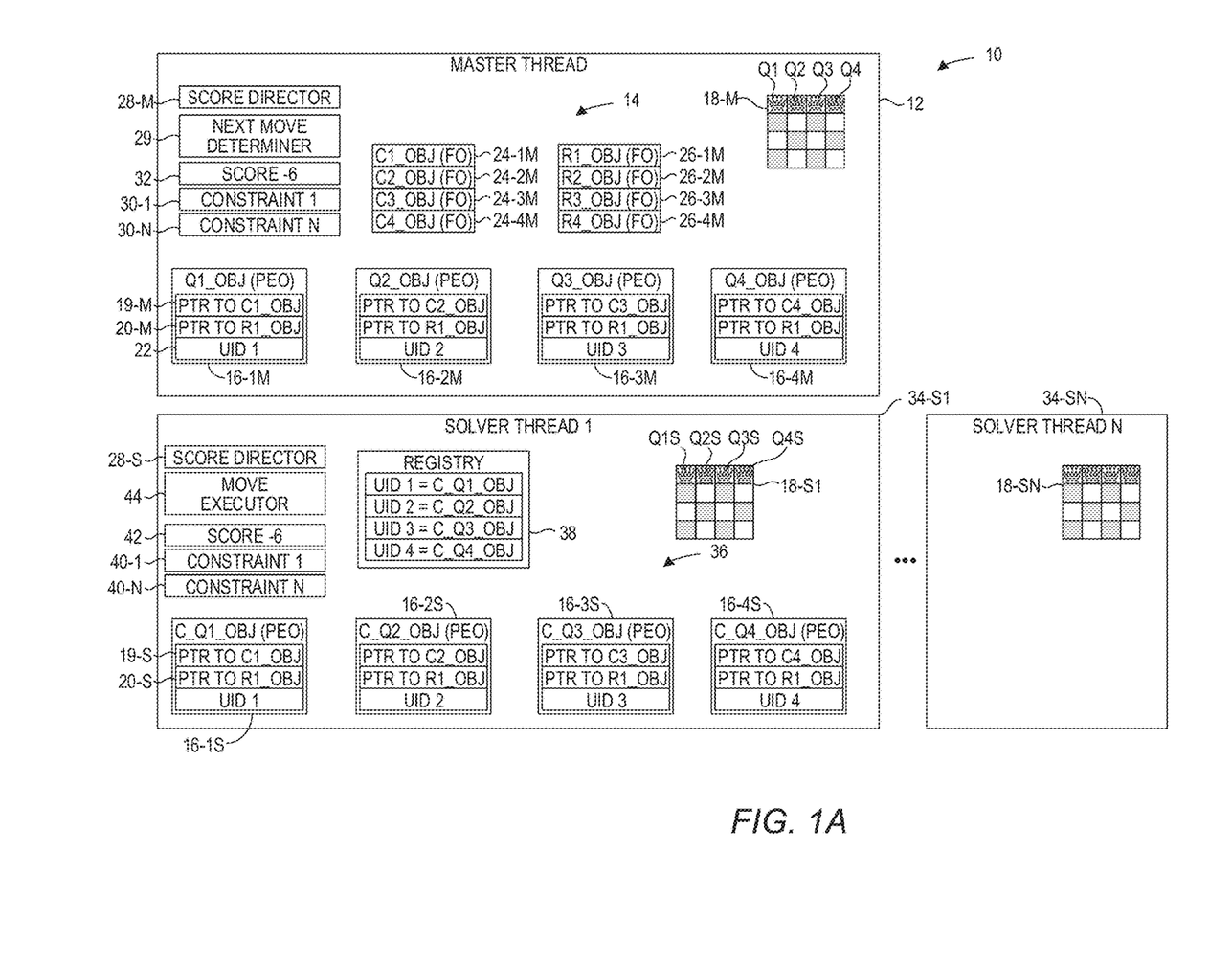
FIGS. 1A-1D are block diagrams of a multi-threaded constraint satisfaction solver at different points in time according to one example.

The planning entity objects 16-1M-16-4M are mutable objects, and thus the state of the planning entity objects 16-1M-16-4M can be changed. The planning entity object 16-1M includes a planning fact 19-M that identifies the column of the location of the queen Q1. A planning fact is data that does not change during a particular problem. In this example, the queens Q1-Q4 do not change columns, and thus the planning fact 19-M does not change during the problem. A planning variable 20-M identifies the row of the location of the queen Q1. A unique identifier 22 uniquely identifies the planning entity object 16-1M. The planning entity objects 16-2M-16-4M have similar planning variables, although with potentially different values, to indicate the locations of the corresponding queens Q2-Q4 on the chessboard. The planning entity objects 16-2M-16-4M also have unique IDs. The model 14 includes a plurality of fact objects 24-1M-24-4M that represent the four columns of the chessboard. Fact objects, unlike planning entity objects, are immutable while solving a particular problem and do not change. The model 14 also includes a plurality of fact objects 26-1M-26-4M that represent the four rows of the chessboard.

The planning fact 19-M is a memory pointer to the fact object 24-1M that indicates the location of the queen Q1 is currently in column 1. The planning variable 20-M is a memory pointer to the fact object 26-1M that indicates the location of the queen Q1 is currently in row 1. The planning variables of the planning entity objects 16-2M-16-4M similarly indicate that the queen Q2 is in column 2, row 1, the queen Q3 is in column 3, row 1, and the queen Q4 is in column 4, row 1, respectively. This may be an initial state of the model 14 provided by a user of the constraint satisfaction solver 10, may have been arbitrarily selected by the master thread 12 as a starting point, or may be the state of previous optimization algorithms. It will be understood that the model 14 is but one way to model the 4-queens problem, and other collections of different immutable and mutable objects may be used to model the 4-queens problem.

The master thread 12 may include a score director 28-M that scores a current solution state of the model 14. The score is based on the collective state of the model 14 and the constraints 30-1-30-N of the particular problem, such as discussed above. No queens should be on the same row, and no queens should be on the same diagonal. In this example, the score director derives a score 32 (−6) for the current state of the model 14 as depicted in the solution state image 18-M. While the scoring mechanism differs for each different constraint-based problem, in this particular 4-queens problem, a solution state is incremented by a value of negative 1 for each constraint that is not met by each pair of queens Q1-Q4. In the current solution state, the score of −6 would be determined by the following queens that could attack another queen (viewed solely by the two queens in a pair, independent of queens in between the two pairs of queens):

Q1 same row as Q2 (−1)
Q1 same row as Q3 (−1)
Q1 same row as Q4 (−1)
Q2 same row as Q3 (−1)
Q2 same row as Q4 (−1)
Q3 same row as Q4 (−1)
Total=−6

The master thread 12 also includes a next move determiner 29 that utilizes various heuristics and/or metaheuristics to determine a series of next potential moves, sometimes referred to herein as incremental state changes (and sometimes referred to as a neighborhood), to the current state of the model 14 to determine the effect on the score 32 by each such move.

The master thread 12 causes the initiation of a plurality of solver threads 34-S1-34-SN. The particular number of solver threads 34-S1-34-SN may be based on, for example, a number of cores of a processor device on which the master thread 12 is executing. The master thread 12 may, for example, access information that provides information about the hardware environment in which the master thread 12 is running, and determine that the processor device has six cores, and thereby cause the initiation of five solver threads 34-S1-34-SN. In other environments, such as a cloud computing environment which offers scalable resources, the master thread 12 may cause the initiation of tens, hundreds or any other desirable number of solver threads 34-S1-34-SN, each of which can execute in its own compute instance, such as a separate host machine or virtual machine.

The solver thread 34-S1 has a model 36 that has an initial solution state that is identical to the solution state of the master thread 12, as indicated by the solution state image 18-S1. In particular, each planning entity object 16-1M-16-4M of the master thread 12 is cloned in the solver thread 34-S1. Thus, the cloned planning entity objects 16-1S-16-4S are clones, or copies, of the planning entity objects 16-1M-16-4M of the master thread 12. The cloned planning entity objects 16-1S-16-4S correspond to queens Q1S-Q4S depicted in the solution state image 18-S1.

In some examples, the model 36 may also include clones of the fact objects 24-1M-24-4M and 26-1M-26-4M; however, in examples where the master thread 12 and the solver threads 34-S1-34-SN can access the same memory locations, such as where the master thread 12 and the solver threads 34-S1-34-SN execute in the same overall memory space, there may be no need to copy immutable fact objects.

In this example, because the solver thread 34-S1 can access the same memory as the master thread 12, a planning fact 19-S of the cloned planning entity object 16-1S is a memory pointer to the fact object 24-1M of the master thread 12 and a planning fact 19-D of the cloned planning entity object 16-1S is a memory pointer to the fact object 26-1M of the master thread 12.

In one example, the solver thread 34-S1 includes a registry 38 that correlates the unique IDs 22 of the planning entity objects 16-1M-16-4M to the corresponding cloned planning entity objects 16-1S-16-4S of the solver thread 34-S1. The solver thread 34-S1 also includes a score director 28-S that, like the score director 28-M, scores a current solution state of the model 36 based on the collective state of the model 36, including the state of the cloned planning entity objects 16-1S-16-4S, and constraints 40-1-40-N, which are the same as the constraints 30-1-30-N of the master thread 12. Thus, in this example, the score director 28-S would determine a score 42 (−6) based on the state of the model 36 as depicted by the solution state image 18-S1, for the reasons discussed above with regard to the score 32. The solver thread 34-S1 also includes a move executor 44 which implements an incremental move, sometimes referred to as an incremental state change, received from the master thread 12.

Due to space limitations, all of the details of the solver thread 34-SN are not illustrated; however, the solver thread 34-SN, and each other solver thread (not illustrated), is substantially configured similarly or identically to that of the solver thread 34-S1, and each has its own cloned planning entities cloned from the planning entity objects 16-1M-16-4M of the master thread 12. Thus, a solution state image 18-SN of the solver thread 34-SN illustrates an identical solution state as that of the master thread 12 and the solver thread 34-S1. Because each solver thread 34-S1-34-SN has its own copy, or clone, of the planning entity objects of the master thread 12, each can manipulate its model without interfering with one another.

Figure 1B:
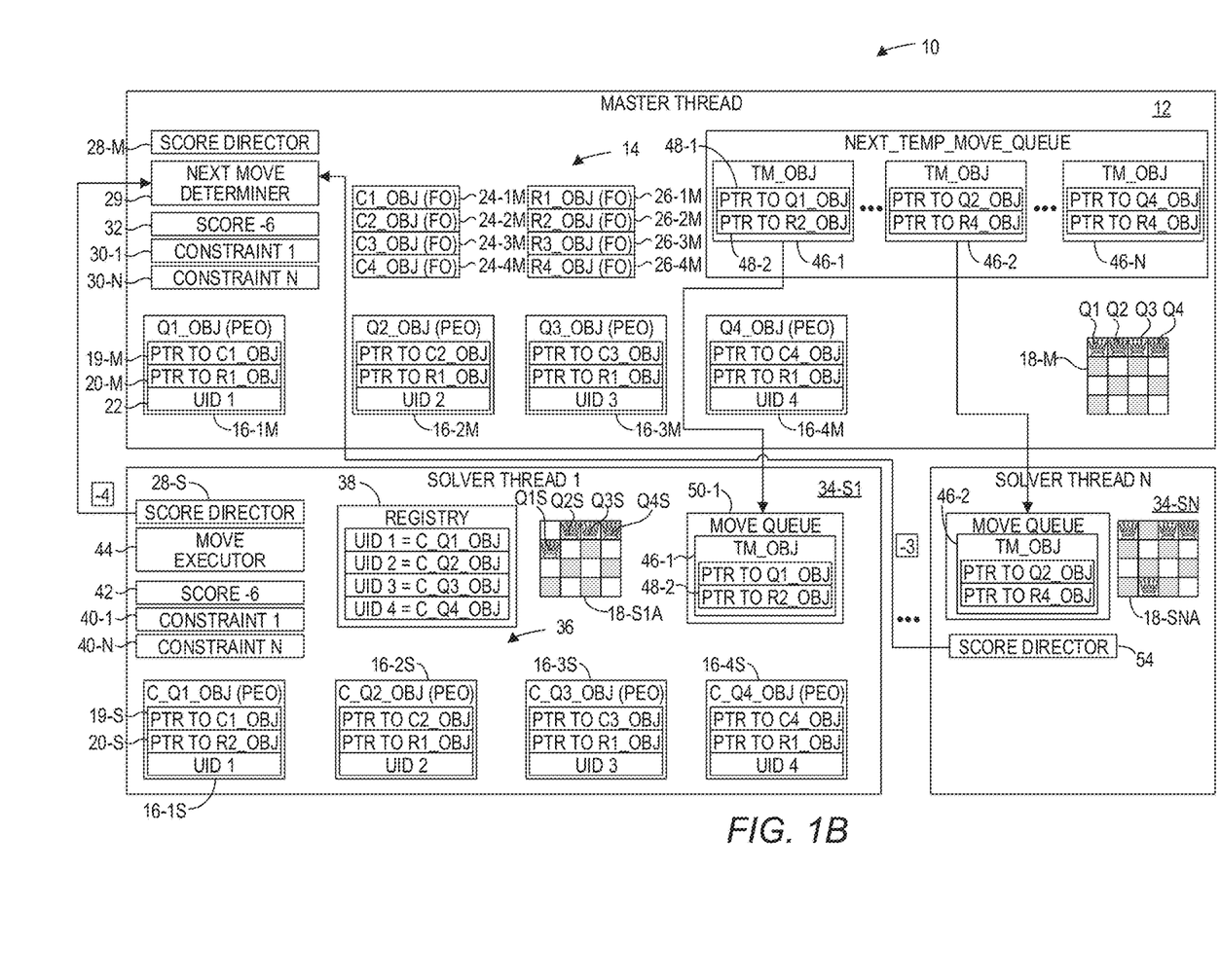

FIG. 1B illustrates the constraint satisfaction solver 10 at a subsequent point in time to that of FIG. 1A. In particular, the next move determiner 29 has generated a plurality of temporary move objects (TM_OBJ) 46-1-46-N, each of which identifies a different temporary incremental state change to be applied by a solver thread 34-S1-34-SN to the current solution state and then scored. The phrase "temporary" as used herein means that after a solver thread 34-S1-34-SN has implemented the incremental state change identified in a TM object 46-1-46-N and scored the effect of the incremental state change on the corresponding model of the respective solver thread 34-S1-34-SN, the respective solver thread 34-S1-34-SN undoes the move to revert the model back to the solution state immediately before implementation of the incremental state change. The next move determiner 29 may use heuristics and/or metaheuristic algorithms to decide which potential next moves are preferable to other potential next moves.

The TM object 46-1 indicates a temporary move of the Q1 to row 2. In particular, a variable 48-1 in the TM object 46-1 is a memory pointer to the planning entity object 16-1M (Q1_OBJ), which represents the queen Q1. A variable 48-2 in the TM object 46-1 is a memory pointer to the fact object 26-2M (R2_OBJ), which represents row 2. In this example, assume that the TM object 46-1 is communicated to the solver thread 34-S1. The TM object 46-1 may be placed into a move queue 50-1 of the solver thread 34-S1. Although not illustrated, the next move determiner 29 may insert the plurality of TM objects 46 into a plurality of queues 50 of the solver threads 34-S1-34-SN in a round robin fashion, for example. Thus, for example, if there are four solver threads 34-S1-34-SN and there are 12 TM objects 46, each solver thread 34-S1-34-SN may be given three different TM objects 46.

The move executor 44 of the solver thread 34-S1 removes the TM object 46-1 from the move queue 50-1. Because the TM object 46-1 contains a memory pointer to the planning entity object 16-1M of the master thread 12, the solver thread 34-S1 determines which cloned planning entity object 16-1S-16-4S of the solver thread 34-S1 corresponds to the planning entity object 16-1M. In this example, the solver thread 34-S1 may access the unique ID 22 of the planning entity object 16-1M via the memory pointer to the planning entity object 16-1M contained in the TM object 46-1. In one example, the solver thread 34-S1 then accesses the registry 38 that correlates the unique IDs of the planning entity objects 16-1M-16-4M to the cloned planning entity objects 16-1S-16-4S. In this example, the solver thread 34-S1, based on the value of 1 of the unique ID 22 of the planning entity object 16-1M, determines that the cloned planning entity object 16-1S corresponds to the planning entity object 16-1M. In other examples, the registry 38 may not be used, and the solver thread 34-S1 compares the planning entity object 16-1M to the plurality of cloned planning entity objects 16-1S-16-4S and determines an equivalency between the planning entity object 16-1M and the cloned planning entity object 16-1S, and thus determines that the cloned planning entity object 16-1S corresponds to the planning entity object 16-1M.

The solver thread 34-S1 then implements the change in state identified in the TM object 46-1 by replacing a row variable 20-S of the cloned planning entity object 16-1S with the variable 48-2 of the TM object 46-1. This alters the solution state of the model 36 by moving the queen Q1S from row 1 to row 2, as indicated by the solution state image 18-S1A.

The solver thread 34-S1 may then, via the score director 28-S, score the current solution state of the model 36. In the current solution state, the score of −4 would be determined by the following queens that could attack another queen (viewed solely by the two queens in a pair, independent of queens in between the two pairs of queens):

Q2S same row as Q3S (−1)
Q2S same row as Q4S (−1)
Q3S same row as Q4S (−1)
Q1S on a diagonal with Q2S (−1)
Total=−4

While the above illustrates the overall score, it should be noted that the score director 28-S need not completely rescore the solution due to incremental scoring implemented by the score director 28-S. Because the examples can use incremental scoring in a multi-threaded constraint solver as disclosed herein, the examples can substantially reduce the processing time that would otherwise be required to completely rescore each temporary move. While the four queens example has been used herein for purposes of illustration, in practice a problem may involve hundreds or thousands of different planning variables, such that rescoring each temporary move from scratch takes a substantial amount of processing time that is eliminated by the disclosed examples.

An example of incremental scoring of the move identified in the TM object 46-1 will now be presented. Prior to implementing the move identified in the TM object 46-1, the score director 28-S maintained a "working score" or "starting score" of −6, based on the solution state of the solver thread 34-S1, as indicated by the solution state image 18-S1 (FIG. 1A). The score director 28-S also maintains certain incremental score information relating to the cloned planning entity objects 16-1S-16-4S that identifies relationships between the cloned planning entity objects 16-1S-16-4S based on the solution state as identified by the solution state image 18-S1 (FIG. 1A). In particular, the incremental score information identifies the following relationship, or set, information based on the position of the queens Q1-Q4 on the board according to the current values of the cloned planning entity objects 16-1S-16-4S:

Q1{Q2,Q3,Q4}
Q2{Q1,Q3,Q4}
Q3{Q1,Q2,Q4}
Q4{Q1,Q2,Q3}

Each set identifies, for a respective queen, the other queens with which the respective queen violates some constraint. Thus, the set Q1{Q2,Q3,Q4} indicates that the queen Q1 violates a constraint with each of the queens Q2, Q3, and Q4. As another example, the set Q2{Q1,Q3,Q4} indicates that the queen Q2 violates a constraint with each of the queens Q1, Q3, and Q4.

The TM object 46-1 identifies a move of the queen Q1 from row 1 to row 2. In a first stage of the move process, the score director 28-S adjusts the sets to remove only the affected queen Q1 from each set, and determines a score delta associated with that set adjustment. In particular, the score director 28-S adjusts the sets to be:

Q1{Q2,Q3,Q4}→Q1{ };
Q2{Q1,Q3,Q4}→Q2{Q3,Q4};
Q3{Q1,Q2,Q4}→Q3{Q2,Q4}; and
Q4{Q1,Q2,Q3}→Q4{Q2,Q3}, resulting in a score of +3, based on the elimination of the constraint violation between the queen Q1 and each of queens Q2, Q3 and Q4.

In a second stage of the move process, the move of the queen Q1 from row 1 to row 2 is then implemented, and the score director 28-S recalculates the scores for the affected queen Q1 only. This scoring may be reflected in the following manner:

Q1 on same diagonal as Q2=−1;
Q1 cannot attack Q3=0; and
Q1 cannot attack Q4=0.

The score director 28-S alters the set information to be
Q1{ }→Q1 {Q2}; and
Q2{Q3,Q4}→Q2{Q1,Q3,Q4}.

The score director 28-S then determines the new score to be:

NEW SCORE=−6(PREVIOUS SCORE)+3−1
(SCORE DELTA)=−4

Note that the score director 28-S needed only to identify the changes impacted by the move of the queen Q1, and did not need to completely rescore the board from scratch. This is only possible because the move was translated from the planning entity objects 16-1M-16-4M to the corresponding cloned planning entity objects 16-1S-16-4S of the solver thread 34-S1.

The score director 28-S sends the score −4 to the master thread 12. The master thread 12 keeps track of each score received from a solver thread 34-S1-34-SN, and to which TM object 46-1-46-N the score relates. The solver thread 34-S1 may then immediately undo the change in state caused by implementing the TM move object 46-1 to place the solution state of the model 36 to the previous, base solution state. The move executor 44 may then retrieve the next TM object from the move queue 50-1 and repeat the process.

Assume for purposes of illustration that the next move determiner 29 sends a TM object 46-2 to the solver thread 34-SN. The solver thread 34-SN implements the TM object 46-2 in the model of the solver thread 34-SN in the same manner as discussed above with regard to the solver thread 34-S1 and the TM object 46-1. The TM object 46-2, however, identifies a change in state wherein the second queen Q2 is moved to row 4. A score director 54 of the solver thread 34-SN then scores the solution state represented by the solution state image 18-SNA. In the solution state identified by the solution state image 18-SNA, the score director determines a score of −3 based on the following:

Q1 same row as Q3 (−1)
Q1 same row as Q4 (−1)
Q3 same row as Q4 (−1)
Total=−3

While the above illustrates the overall score, it should be noted that the score director 54 need not completely rescore the solution due to incremental scoring implemented by the score director 54.

The solver thread 34-SN then sends the score (−3) to the master thread 12.

The master thread 12 receives all the scores associated with each incremental state change identified in the TM objects 46-1-46-N. In this example, the score −3 associated with the TM object 46-2 is a highest score, and is thus likely selected as the best score. It will be appreciated that scoring could use either a highest score or a lowest score to distinguish preferable solution states.

Figure 1C:
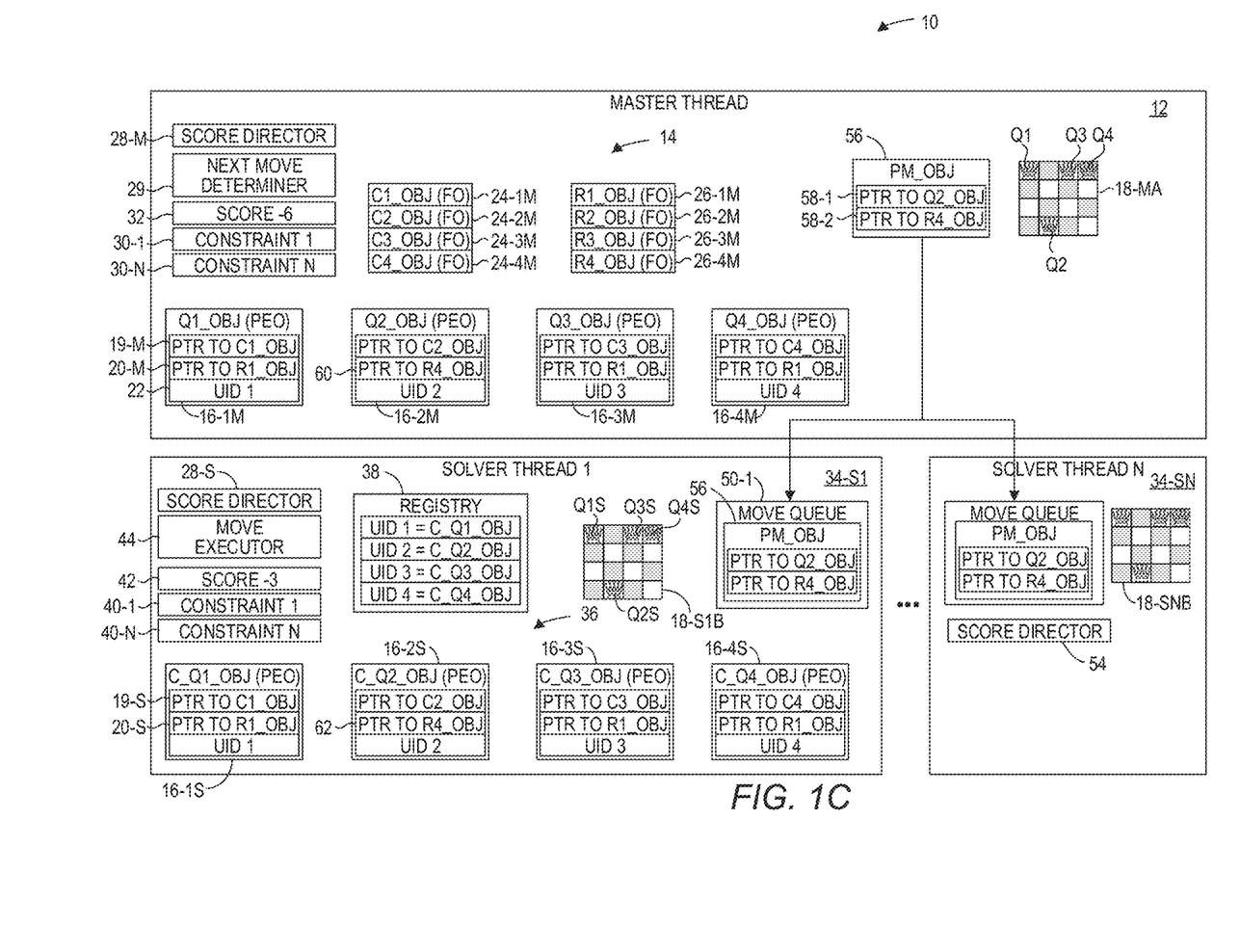

FIG. 1C illustrates the constraint satisfaction solver 10 at a subsequent point in time to that of FIG. 1B. In particular, in response to determining that the score associated with the TM object 46-2 is the best score, and thus that the temporary incremental change identified in the TM object 46-2 results in the best solution state of the plurality of TM objects 46-2-46-N, the master thread 12 generates a permanent move (PM) object 56 that identifies a permanent incremental move that, when implemented by the solver threads 34-S1-34-SN, identifies a new solution state for each solver thread 34-S1-34-SN that matches the solution state associated with the particular score. The phrase "permanent" as used herein with respect to a state change means that after a solver thread 34-S1-34-SN has implemented the incremental state change identified in a PM object 56 and scored the effect of the incremental state change on the corresponding model of the respective solver thread 34-S1-34-SN, the respective solver thread 34-S1-34-SN does not undo the move. However, the particular cloned planning entity objects that changed as a result of the permanent incremental state change could later be further changed by subsequent permanent incremental state changes. After the solver threads 34-S1-34-SN implement the permanent incremental move identified in the PM object 56, the new solution states of each solver thread 34-S1-34-SN will be identical to one another.

The PM object 56 includes a variable 58-1 that is a memory pointer to the planning entity object 16-2M, which corresponds to the queen Q2. The PM object 56 includes a variable 58-2 that is a memory pointer to the fact object 24-4M, which corresponds to the row R4. Thus, the PM object 56 identifies a permanent incremental move that causes a permanent state change to the models of the solver threads 34-S1-34-SN, wherein the queen in column 2 of each model is moved to row 4.

The master thread 12 implements a permanent state change to the solution state of the model 14 that matches the solution state associated with the best score. In this particular example, the master thread 12 modifies a variable 60 of the planning entity object 16-2M to point to the fact object 26-4M. This causes the queen Q2 to be moved to row 4 in the model 14, as illustrated by the solution state image 18-MA.

The master thread 12 sends the PM object 56 to each of the solver threads 34-S1-34-SN. Each of the solver threads 34-S1-34-SN implements the permanent incremental state change. In particular, the solver thread 34-S1 accesses the PM object 56 in the move queue 50-1, determines that the cloned planning entity object 16-2S corresponds to the planning entity object 16-2M (Q2_OBJ), and implements the change in the state on the corresponding cloned planning entity object 16-2S by altering a variable 62 of the cloned planning entity object 16-2S to refer to the fact object 26-4M (R4_OBJ). While for purposes of illustration only one planning entity object 16 is discussed as being moved, in practice, a number of different planning entity objects 16 may be affected by a PM object 56, such as, by way of non-limiting example, in the example of a swap move involving two queens.

This permanent state change alters the model 36 such that the queen Q2S is now positioned at row 4, as indicated by the solution state image 18-S1B. The solver thread 34-SN similarly makes the same permanent move, so that the model of the solver thread 34-SN is in the same solution state as that of the other solver threads 34-S1-34-SN, as indicated by the solution state image 18-SNB.

Figure 1D:
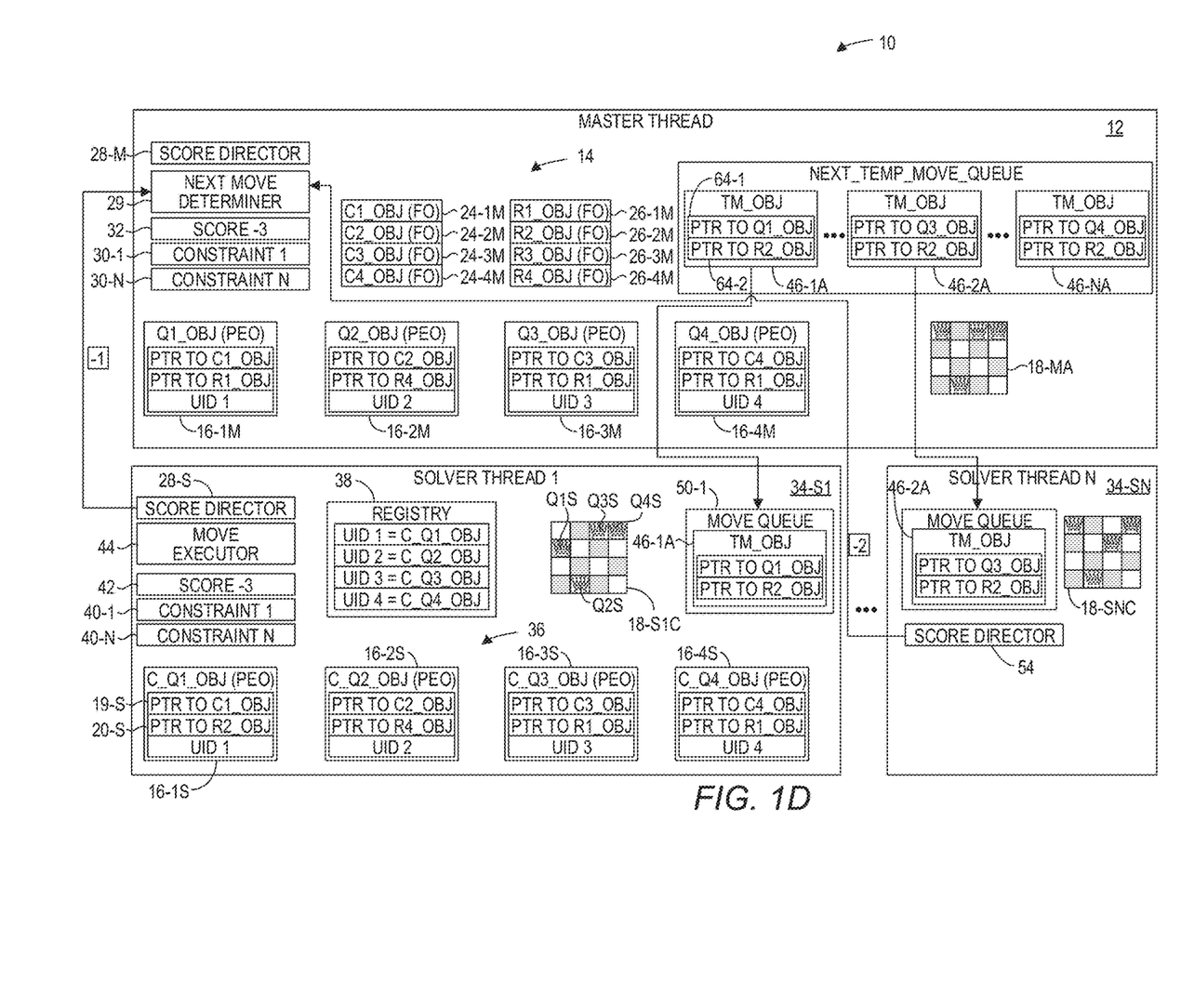

FIG. 1D illustrates the constraint satisfaction solver 10 at a subsequent point in time to that of FIG. 1C. In particular, the next move determiner 29 now utilizes various heuristics and/or metaheuristics to determine a series of next potential moves to the new solution state of the model 14. The next move determiner 29 generates a plurality of temporary move (TM) objects 46-1A-46-NA, each of which identifies a different temporary incremental state change to be applied by a solver thread 34-S1-34-SN to the current solution state and then scored. The TM object 46-1A indicates a temporary move of the Q1 to row 2. In particular, a variable 64-1 in the TM object 46-1A is a memory pointer to the planning entity object 16-1M, which represents the queen Q1. A variable 64-2 in the TM object 46-1A is a memory pointer to the fact object 26-2M, which represents row 2. In this example, assume that the TM object 46-1A is communicated to the solver thread 34-S1. The TM object 46-1A may be placed into the move queue 50-1 of the solver thread 34-S1.

The move executor 44 of the solver thread 34-S1 removes the TM object 46-1A from the move queue 50-1, and makes the temporary incremental state change to the model 36 in the manner discussed above with regard to FIG. 1B. The temporary incremental state change causes the queen Q1S to be moved to row 2, as indicated by the solution state image 18-S1C.

The solver thread 34-S1 may then, via the score director 28-S, score the current solution state of the model 36. In the current solution state, the score of −1 would be determined by the identified constraints 40-1-40-N:

QS3 same row as QS4 (−1)
Total=−1

While the above illustrates the overall score, it should be noted that the score director 28-S need not completely rescore the solution due to incremental scoring implemented by the score director 28-S. The score director 28-S sends the score −1 to the master thread 12. The master thread 12 keeps track of each score received from a solver thread 34-S1-34-SN, and to which TM object 46-1A-46-NA the score relates. The solver thread 34-S1 may then immediately undo the change in state caused by implementing the TM move object 46-1A to place the solution state of the model 36 to the previous, base solution state. The move executor 44 may then retrieve the next TM object (not illustrated) from the move queue 50-1 and repeat the process.

Assume for purposes of illustration that the next move determiner 29 sends a TM object 46-2A to the solver thread 34-SN. The solver thread 34-SN implements the TM object 46-2A in the model of the solver thread 34-SN in the same manner as discussed above with regard to the solver thread 34-S1 and the TM object 46-1A. The TM object 46-2A, however, identifies a change in state wherein the third queen is moved to row 2. The score director 54 of the solver thread 34-SN then scores the solution state represented by the solution state image 18-SNC. In the solution state identified by the solution state image 18-SNC, the score director determines a score of −2 based on the following:

Q1 same row as Q4 (−1)
Q3 on same diagonal as Q4 (−1)
Total=−2

While the above illustrates the overall score, it should be noted that the score director 54 need not completely rescore the solution due to incremental scoring implemented by the score director 54. The solver thread 34-SN then sends the score (−2) to the master thread 12.

The process described in FIGS. 1A-1D may be repeated until a best solution is determined. While in the simple 4-queens problem, there are two solution states that can be identified that meet all the constraints 30-1-30-N, in many constraint-based problems, there may be no perfect solution that will meet all the constraints, and thus, the "best" solution may be determined after a predetermined elapsed duration of the constraint satisfaction solver 10, or based on some other criteria.

Figure 2:
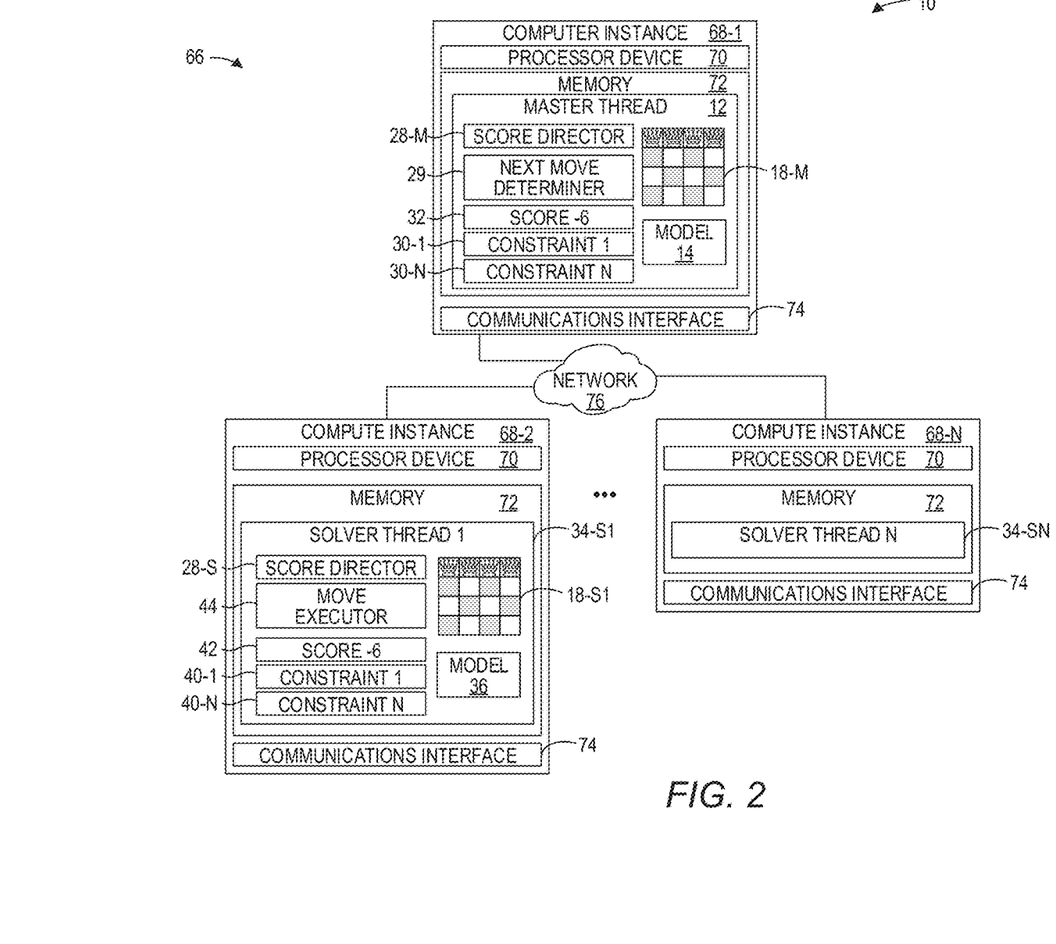
FIG. 2 is a block diagram of the constraint satisfaction solver in a cloud computing environment, according to one example.

FIG. 2 is a block diagram of the constraint satisfaction solver 10 according to another example. In this example, the master thread 12 operates in a cloud environment 66. The cloud environment 66 offers scalable processing resources on demand. The cloud environment implements processing resources via one or more compute instances 68-1-68-N (generally, compute instances 68). Each compute instance 68 may comprise, for example, a host machine, or a virtual machine running on a host machine. Each compute instance 68 comprises a processor device 70 and a memory 72. Each compute instance 68 may also include a communications interface 74 suitable for communicating with a network 76 to facilitate communications between the compute instances 68.

The master thread 12 may be initiated in a compute instance 68-1. The master thread 12 causes the establishment of the solver threads 34-S1-34-SN in compute instances 68-2-68-N. In this environment, the complete model 14 of the master thread 12 including the planning entity objects 16-1M-16-4M, the fact objects 24-1M-24-4M, and the fact objects 26-1M-26-4M, may be cloned on the solver threads 34-S1-34-SN. Each of the planning entity objects 16-1M-16-4M, the fact objects 24-1M-24-4M, and the fact objects 26-1M-26-4M may have a unique ID, and each solver thread 34-S1-34-SN obtains a registry that correlates the unique ID of any object of the master thread 12 to a corresponding cloned object of the respective solver threads 34-S1-34-SN. Otherwise, the operation of the constraint satisfaction solver 10 is substantially similar to that discussed above with regard to FIGS. 1A-1D.

Figure 3:
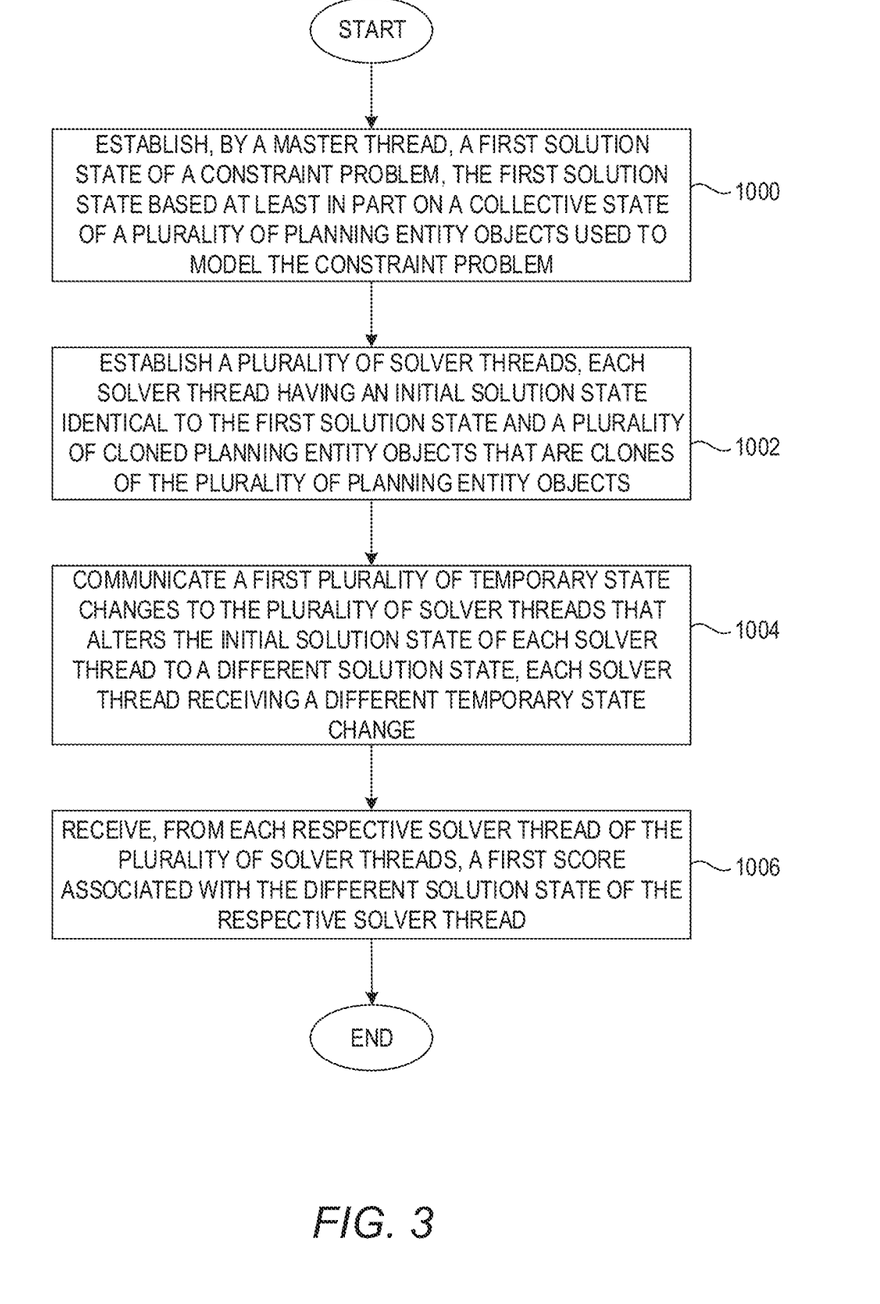
FIG. 3 is a method for multi-threading in a constraint satisfaction solver according to one example.

FIG. 3 is a method for multi-threading in a constraint satisfaction solver 10 according to one example. FIG. 3 will be discussed in conjunction with FIGS. 1A-1D. The master thread 12 establishes a first solution state of a constraint problem. The first solution state is based at least in part on a collective state of the plurality of planning entity objects 16-1M-16-4M used to model the constraint problem (FIG. 3, block 1000). The master thread establishes the plurality of solver threads 34-S1-34-SN. Each solver thread 34-S1-34-SN has an initial solution state that is identical to the first solution state and a plurality of cloned planning entity objects 16-1S-16-4S that are clones of the plurality of planning entity objects 16-1M-16-4M (FIG. 3, block 1002). The master thread 12 communicates a first plurality of temporary state changes to the plurality of solver threads 34-S1-34-SN that alters the initial solution state of each solver thread 34-S1-34-SN to a different solution state. Each solver thread 34-S1-34-SN receives a different temporary state change (FIG. 3, block 1004). The master thread 12 receives, from each respective solver thread 34-S1-34-SN of the plurality of solver threads 34-S1-34-SN, a first score associated with the different solution state of the respective solver thread 34-S1-34-SN (FIG. 3, block 1006).

Figure 4:
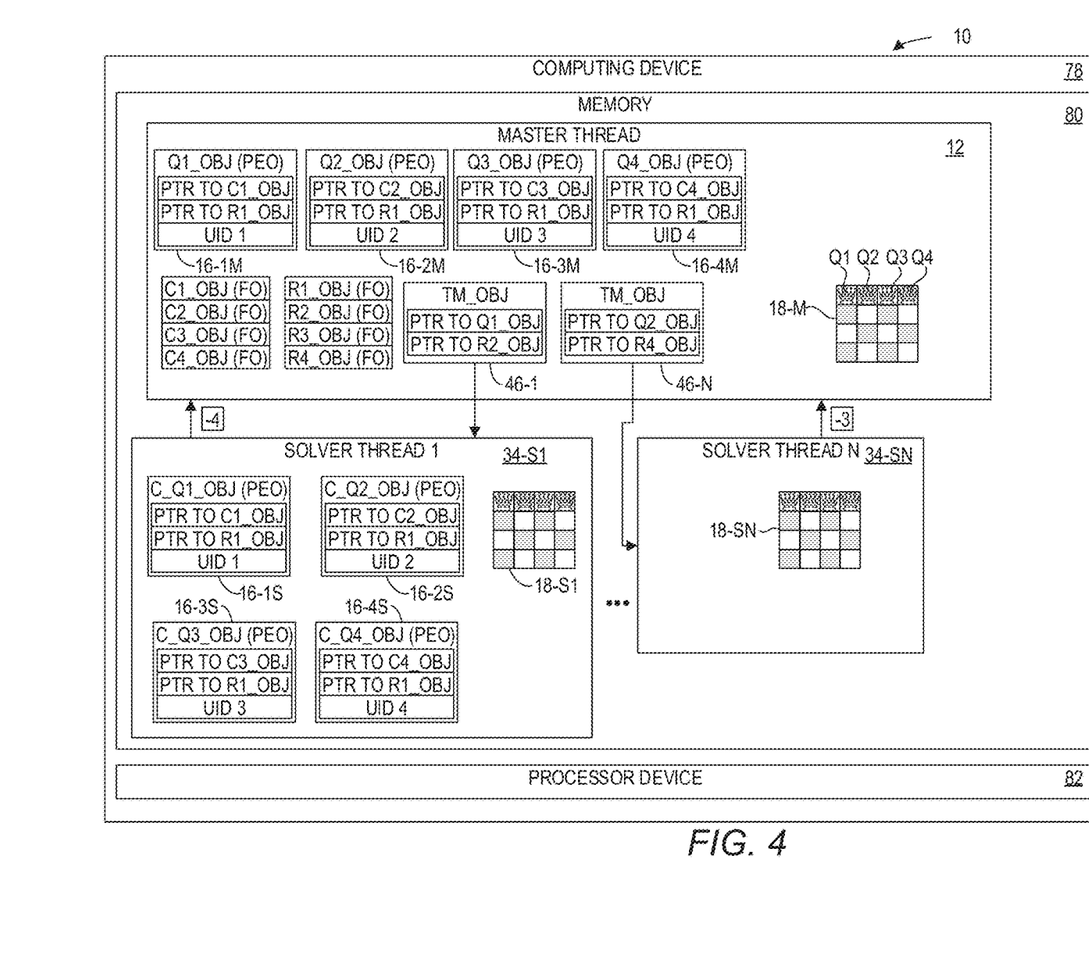
FIG. 4 is a block diagram of the constraint satisfaction solver according to another example.

FIG. 4 is a block diagram of the constraint satisfaction solver 10 according to another example. A computing device 78 includes a memory 80 and a processor device 82. The processor device 82 is to establish a first solution state of a constraint problem. The first solution state is based at least in part on a collective state of the plurality of planning entity objects 16-1M-16-4M used to model the constraint problem. The processor device 82 is further to establish, via the master thread 12, the plurality of solver threads 34-S1-34-SN. Each solver thread 34-S1-34-SN has an initial solution state that is identical to the first solution state and a plurality of cloned planning entity objects 16-1S-16-4S that are clones of the plurality of planning entity objects 16-1M-16-4M. The processor device 82 is further to communicate, via the master thread 12, a first plurality of temporary state changes to the plurality of solver threads 34-S1-34-SN that alters the initial solution state of each solver thread 34-S1-34-SN to a different solution state. Each solver thread 34-S1-34-SN receives a different temporary state change. The processor device 82 is further to receive, from each respective solver thread 34-S1-34-SN of the plurality of solver threads 34-S1-34-SN, a first score associated with the different solution state of the respective solver thread 34-S1-34-SN.

Figure 5:
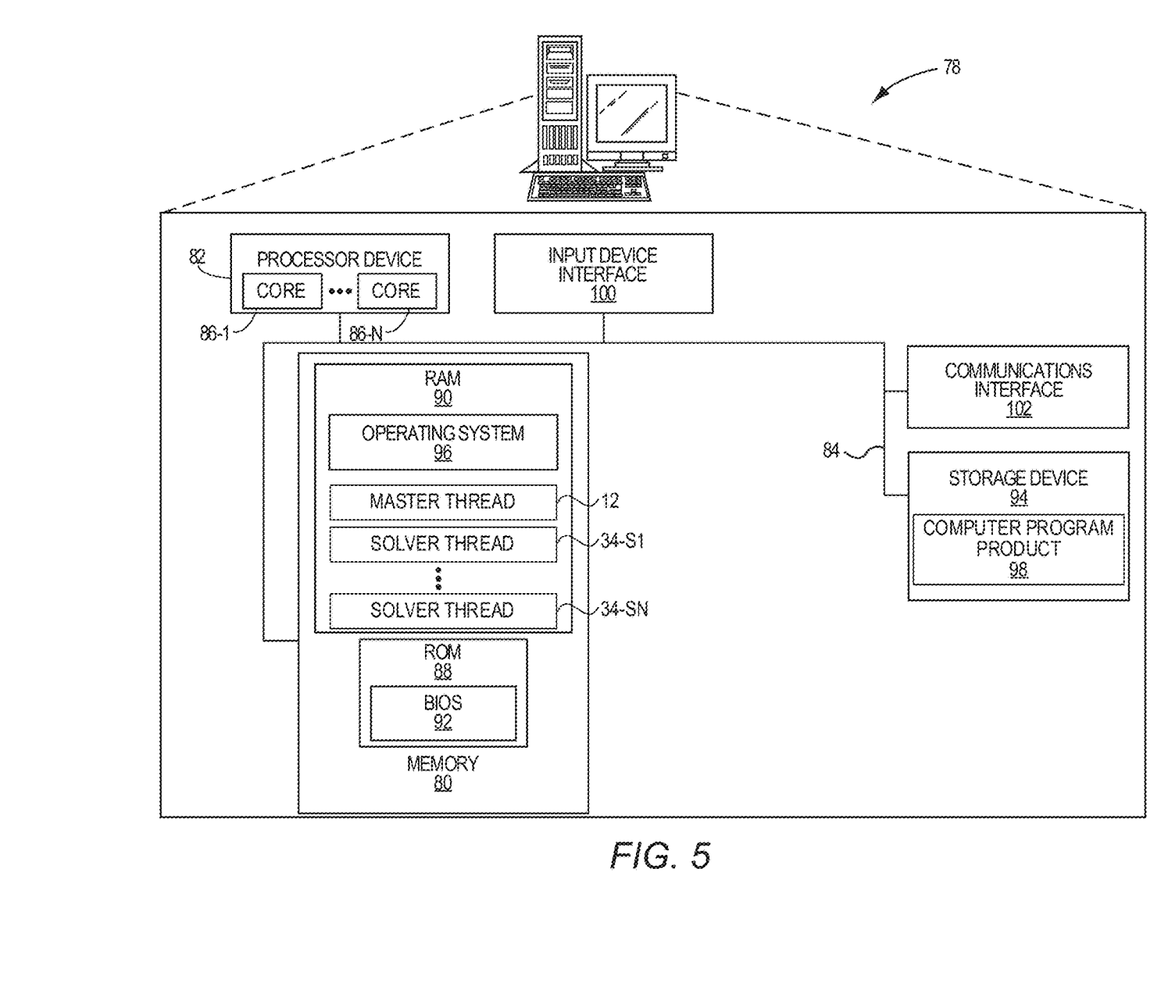
FIG. 5 is a block diagram of a computing device illustrated in FIG. 4 shown in greater detail, according to one example.

FIG. 5 is a block diagram of the computing device 78 illustrated in greater detail, according to one example. The computing device 78 may comprise any computing or electronic device capable of including firmware, hardware, and/or executing software instructions to implement the functionality described herein, such as a computer server, a desktop computing device, a laptop computing device, a compute instance, or the like. The computing device 78 includes the processor device 82, the memory 80, and a system bus 84. The processor device 82 may include a plurality of cores 86-1-86-N. The system bus 84 provides an interface for system components including, but not limited to, the memory 80 and the processor device 82. The processor device 82 can be any commercially available or proprietary processor.

The system bus 84 may be any of several types of bus structures that may further interconnect to a memory bus (with or without a memory controller), a peripheral bus, and/or a local bus using any of a variety of commercially available bus architectures. The memory 80 may include non-volatile memory 88 (e.g., read-only memory (ROM), erasable programmable read-only memory (EPROM), electrically erasable programmable read-only memory (EEPROM), etc.), and volatile memory 90 (e.g., random-access memory (RAM)). A basic input/output system (BIOS) 92 may be stored in the non-volatile memory 88 and can include the basic routines that help to transfer information between elements within the computing device 78. The volatile memory 90 may also include a high-speed RAM, such as static RAM, for caching data.

The computing device 78 may further include or be coupled to a non-transitory computer-readable storage medium such as a storage device 94, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 94 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 94 and in the volatile memory 90, including an operating system 96 and one or more program modules, such as the master thread 12 and the solver threads 34-S1-34-SN, which may implement the functionality described herein in whole or in part.

All or a portion of the examples may be implemented as a computer program product 98 stored on a transitory or non-transitory computer-usable or computer-readable storage medium, such as the storage device 94, which includes complex programming instructions, such as complex computer-readable program code, to cause the processor device 82 to carry out the steps described herein. Thus, the computer-readable program code can comprise software instructions for implementing the functionality of the examples described herein when executed on the processor device 82.

An operator may also be able to enter one or more configuration commands through a keyboard (not illustrated), a pointing device such as a mouse (not illustrated), or a touch-sensitive surface such as a display device (not illustrated). Such input devices may be connected to the processor device 82 through an input device interface 100 that is coupled to the system bus 84, but can be connected by other interfaces such as a parallel port, an Institute of Electrical and Electronic Engineers (IEEE) 1394 serial port, a Universal Serial Bus (USB) port, an IR interface, and the like.

The computing device 78 may also include a communications interface 102 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method for multi-threading, comprising:
   establishing, by a master thread executing on a computing device comprising a processor device, an initial solution state of a constraint problem, the initial solution state based at least in part on a collective state of a plurality of planning entity objects used to model the constraint problem;
   establishing, by the master thread executing on the computing device, a plurality of solver threads, each solver thread having an initial solution state that is identical to the initial solution state of the master thread and having a plurality of cloned planning entity objects that are clones of the plurality of planning entity objects;
   communicating, by the master thread executing on the computing device, a first plurality of temporary state changes to the plurality of solver threads that alters the initial solution state of each solver thread to a different solution state;
   receiving, from each respective solver thread of the plurality of solver threads, a first score associated with the different solution state of the respective solver thread;
   identifying, by the master thread executing on the computing device, a particular score received from a particular solver thread of the plurality of solver threads as a best score; and
   implementing a permanent state change to the initial solution state of the master thread to generate a new solution state that matches a solution state associated with the particular score.

2. The method of claim 1 further comprising:
   sending, by the master thread to each solver thread, the permanent state change that, when implemented by the solver thread, identifies a new solution state for each solver thread that matches the solution state associated with the particular score, wherein the new solution state of each solver thread is identical to one another.

3. The method of claim 2 further comprising:
communicating, by the master thread, a second plurality of temporary state changes to the plurality of solver threads that alters the new solution state of each solver thread to a different solution state, each solver thread receiving a different temporary state change; and
receiving, from each respective solver thread of the plurality of solver threads, a second score associated with the different solution state of the respective solver thread.

4. The method of claim 1 wherein communicating the first plurality of temporary state changes to the plurality of solver threads comprises:
generating a temporary move object that comprises:
a memory pointer to at least one planning entity object of the master thread; and
a change in a state of the at least one planning entity object; and
communicating the temporary move object to a first solver thread of the plurality of solver threads.

5. The method of claim 4 wherein communicating the first plurality of temporary state changes to the plurality of solver threads comprises:
generating a plurality of temporary move objects, each temporary move object comprising:
a memory pointer to at least one planning entity object of the master thread;
a change in a state of the at least one planning entity object;
wherein each temporary move object differs from other temporary move objects; and
communicating a different temporary move object to each of the plurality of solver threads.

6. The method of claim 4 further comprising:
accessing, by the first solver thread, the temporary move object;
determining, by the first solver thread, a corresponding cloned planning entity object that corresponds to the at least one planning entity object of the master thread; and
implementing the change in the state on the corresponding cloned planning entity object.

7. The method of claim 6 wherein determining the corresponding cloned planning entity object comprises:
accessing the at least one planning entity object of the master thread to determine a unique identifier (ID) of the at least one planning entity object; and
accessing a registry that correlates the unique ID of the at least one planning entity object of the master thread to the corresponding cloned planning entity object of the first solver thread.

8. The method of claim 6 wherein determining the corresponding cloned planning entity object comprises:
accessing, by the first solver thread, the at least one planning entity object of the master thread;
comparing, by the first solver thread, the at least one planning entity object of the master thread to the plurality of cloned planning entity objects of the solver thread; and
determining that the corresponding cloned planning entity object corresponds to the at least one planning entity object of the master thread based on the comparing step.

9. The method of claim 1 further comprising:
receiving, by a first solver thread, a first temporary state change of the first plurality of temporary state changes;
implementing, by the first solver thread, the first temporary state change to alter the initial solution state of the first solver thread to a different solution state;
scoring, by the first solver thread, the different solution state; and
undoing the first temporary state change to revert the different solution state back to a solution state immediately prior to implementing the first temporary state change.

10. The method of claim 1 wherein communicating the first plurality of temporary state changes to the plurality of solver threads comprises:
generating a temporary move object that comprises:
a first memory pointer to at least one planning entity object of the master thread;
a change in a state of at least one mutable planning entity object; and
a second memory pointer to an immutable fact object of the master thread;
communicating the temporary move object to a first solver thread of the plurality of solver threads.

11. The method of claim 10 comprising:
accessing, by the first solver thread, the temporary move object;
determining, by the first solver thread, a corresponding cloned planning entity object that corresponds to the at least one mutable planning entity object of the master thread; and
implementing the change in the state on the corresponding cloned planning entity object using the second memory pointer to the immutable fact object of the master thread.

12. The method of claim 1, wherein the master thread executes on a first host machine, and at least one solver thread executes on a second host machine.

13. The method of claim 1, wherein the master thread executes on a first host machine, and each solver thread executes on a different host machine.

14. The method of claim 1 further comprising:
receiving, by a first solver thread, a temporary state change of the first plurality of temporary state changes;
accessing a working score associated with a current solution state of the first solver thread;
determining a subset of cloned planning entity objects of the plurality of cloned planning entity objects that are altered by the temporary state change; and
determining a first score associated with the temporary state change based on the working score and a score delta associated with an implementation of the temporary state change on the subset of cloned planning entity objects.

15. A computing device comprising:
a memory; and
at least one processor device coupled to the memory to:
establish, via a master thread, an initial solution state of a constraint problem, the initial solution state based at least in part on a collective state of a plurality of planning entity objects used to model the constraint problem;
establish, by the master thread, a plurality of solver threads, each solver thread having an initial solution state that is identical to the initial solution state of the master thread, and having a plurality of cloned planning entity objects that are clones of the plurality of planning entity objects;
communicate, by the master thread, a first plurality of temporary state changes to the plurality of solver threads that alters the initial solution state of each solver thread to a different solution state;

receive, from each respective solver thread of the plurality of solver threads, a first score associated with the different solution state of the respective solver thread;

identify, by the master thread, a particular score received from a particular solver thread of the plurality of solver threads as a best score; and implement a permanent state change to the initial solution state of the master thread to generate a new solution state that matches a solution state associated with the particular score.

16. The computing device of claim 15 wherein the at least one processor device is further to:

send, via the master thread to each solver thread, the permanent state change that, when implemented by the solver thread, identifies a new solution state for each solver thread that matches the solution state associated with the particular score, wherein the new solution state of each solver thread is identical to one another.

17. The computing device of claim 15 wherein to communicate the first plurality of temporary state changes to the plurality of solver threads, the at least one processor device is further to:

generate a temporary move object that comprises:
    a memory pointer to at least one planning entity object of the master thread; and
    a change in a state of the at least one planning entity object; and communicate the temporary move object to a first solver thread of the plurality of solver threads.

18. A computer program product stored on a non-transitory computer-readable storage medium and including instructions to cause a processor device to:

establish, via a master thread, an initial solution state of a constraint problem, the initial solution state based at least in part on a collective state of a plurality of planning entity objects used to model the constraint problem;

establish, by the master thread, a plurality of solver threads, each solver thread having an initial solution state that is identical to the initial solution state of the master thread and having a plurality of cloned planning entity objects that are clones of the plurality of planning entity objects;

communicate, by the master thread, a first plurality of temporary state changes to the plurality of solver threads that alters the initial solution state of each solver thread to a different solution state;

receive, from each respective solver thread of the plurality of solver threads, a first score associated with the different solution state of the respective solver thread;

identify, by the master thread, a particular score received from a particular solver thread of the plurality of solver threads as a best score; and implement a permanent state change to the initial solution state of the master thread to generate a new solution state that matches a solution state associated with the particular score.

19. The computer program product of claim 18 wherein the instructions further cause the processor device to:

send, via the master thread to each solver thread, the permanent state change that, when implemented by the solver thread, identifies a new solution state for each solver thread that matches the solution state associated with the particular score, wherein the new solution state of each solver thread is identical to one another.

20. The computer program product of claim 18 wherein to communicate the first plurality of temporary state changes to the plurality of solver threads, the instructions further cause the processor device to:

generate a temporary move object that comprises:
    a memory pointer to at least one planning entity object of the master thread; and
    a change in a state of the at least one planning entity object; and communicate the temporary move object to a first solver thread of the plurality of solver threads.

* * * * *